US012482617B2

(12) United States Patent
Summer

(10) Patent No.: US 12,482,617 B2
(45) Date of Patent: Nov. 25, 2025

(54) CIRCUIT BREAKER

(71) Applicant: Schneider Electric Industries SAS, Rueil-Malmaison (FR)

(72) Inventor: Raimund Summer, Regensburg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 242 days.

(21) Appl. No.: 18/228,186

(22) Filed: Jul. 31, 2023

(65) Prior Publication Data

US 2024/0047158 A1 Feb. 8, 2024

(30) Foreign Application Priority Data

Aug. 3, 2022 (DE) ......................... 102022119447.7

(51) Int. Cl.
*H01H 33/662* (2006.01)
*H01H 33/664* (2006.01)

(52) U.S. Cl.
CPC ................. *H01H 33/66207* (2013.01); *H01H 33/66238* (2013.01); *H01H 33/664* (2013.01)

(58) Field of Classification Search
CPC ....... H01H 33/66207; H01H 33/66238; H01H 33/664; H01H 33/666; H01H 33/121; H01H 33/122; H01H 33/561; H01H 33/6661; H01H 2033/6648; H01H 1/50
USPC ................................ 218/118, 134, 138, 139
See application file for complete search history.

(56) References Cited

U.S. PATENT DOCUMENTS

| | | | | |
|---|---|---|---|---|
| 3,983,345 A * | 9/1976 | Phillips | H01H 33/668 | 361/120 |
| 8,723,070 B2 * | 5/2014 | Yoshida | H02B 13/0354 | 218/155 |
| 9,472,356 B2 * | 10/2016 | Matsunaga | H01H 9/08 | |
| 11,276,991 B2 * | 3/2022 | Schuemann | H01H 33/666 | |
| 2008/0302765 A1 * | 12/2008 | Renz | H01H 33/66207 | 218/134 |
| 2012/0103941 A1 * | 5/2012 | Nakayama | H02B 13/0354 | 218/134 |
| 2015/0244158 A1 * | 8/2015 | Fukuoka | H01B 17/26 | 218/139 |
| 2021/0043395 A1 * | 2/2021 | Bartz | H01H 33/666 | |

FOREIGN PATENT DOCUMENTS

| | | |
|---|---|---|
| EP | 2824684 A1 | 1/2015 |
| JP | S5229946 U | 3/1977 |
| JP | S61148730 A | 7/1986 |

OTHER PUBLICATIONS

German Search Report dated Apr. 25, 2023 for corresponding German Patent Application No. 102022119447.7, 6 pages.

* cited by examiner

*Primary Examiner* — William A Bolton
(74) *Attorney, Agent, or Firm* — Patterson + Sheridan, LLP

(57) ABSTRACT

A circuit breaker comprises a vacuum chamber in which a fixed contact and a movable contact are located. A compensating reservoir comprising a counter-pressure element is provided for a good contacting.

18 Claims, 4 Drawing Sheets

CIRCUIT BREAKER

Figure 2:
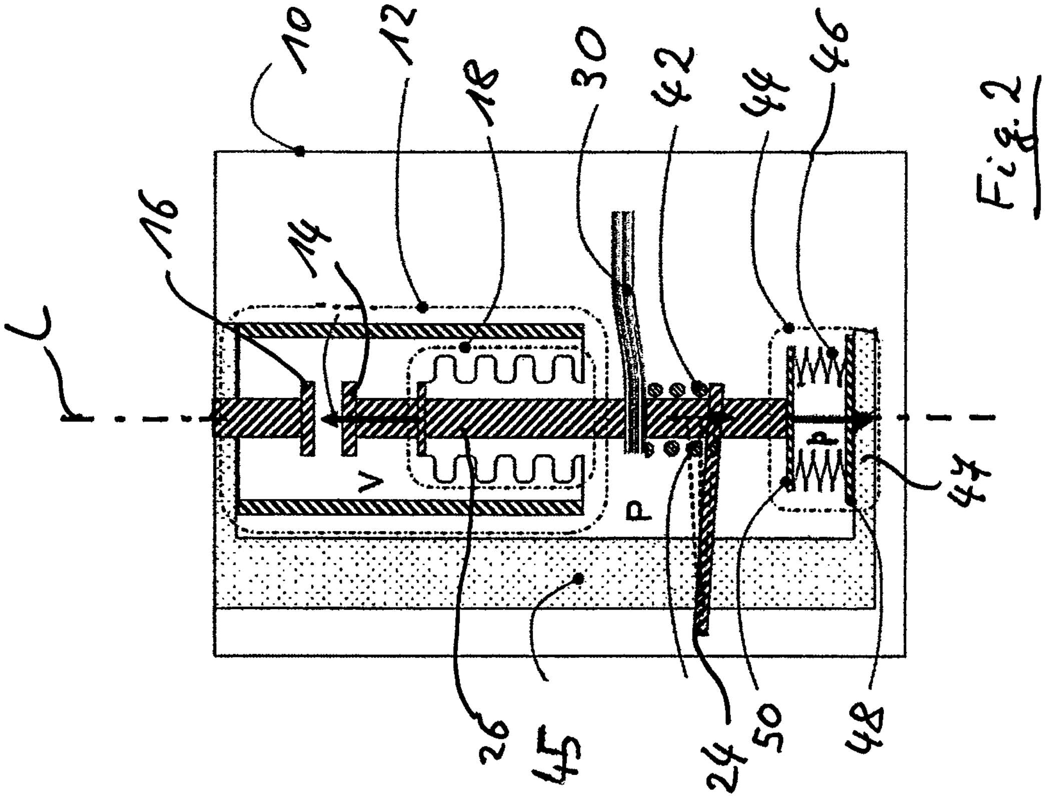

The present invention relates to a circuit breaker of medium-voltage technology or high-voltage technology, comprising a vacuum chamber that has a longitudinal axis and a fixed and a movable contact, said movable contact being acted on by the environmental pressure of the vacuum chamber. A drive mechanism is provided to move the movable contact between an open position and a closed position. A pressure difference between the interior of the vacuum chamber and its environment affects the dynamics of the switching process since it influences the acceleration of the movable contact in addition to the driving force of the drive mechanism. In this respect, the effect is asymmetrical, namely decelerating during opening and accelerating during closing, which affects the respective required drive force during opening and closing. During opening, a switching arc should be extinguished successfully and quickly. When closing the contacts, too small a closing force can cause contacts to weld or stick together in the event of short-circuit currents or to bounce when the end position is reached.

During operation, the environmental pressure of the vacuum chamber can, for example, vary due to the instantaneous operating temperature, due to the electrical operating current, due to a changing environmental temperature, and due to gas loss, for example, in case of leakage when the circuit breaker is used in systems with reservoirs that have been designed for and filled with a gas at a higher or lower pressure to adapt the electric strength at a higher or lower operating voltage. Due to the partly large differences in pressure at a nominal operating current or in the event of a gas pressure loss, the design can be difficult and this can mean that a safe closing is no longer possible in the event of pressure loss.

To move the contacts, the drive mechanism usually has a spring accumulator that is tensioned in a motorized and/or manual manner to open and close the movable contact.

It is the object of the present invention to provide a circuit breaker of the initially mentioned kind by which constant dynamics of the switching process both when opening and closing the movable contact can be achieved almost independently of the environmental pressure of the vacuum chamber, and thus an efficient and safe opening and closing of the movable contact can be achieved.

These objects are satisfied by the features of claim 1 and in particular in that, in a circuit breaker of the kind mentioned above, the movable contact is connected to at least one counter-pressure element outside the vacuum chamber, said counter-pressure element being a movable component of a compensating reservoir that is pressure-tight sealed, that has an inner pressure, and that is in particular installed in a fixed position or fixed to the housing.

In conventional gas-insulated switchgear, the pressure in the gas-insulated compartment when using an insulating gas (SF6, nitrogen, carbon dioxide, air, or mixtures with fluorinated gases) is in an order of magnitude of 0.3 bar (up to 3 bar) for medium-voltage systems and from approximately 3 bar to 10 bar for high-voltage systems. When the movable contact in the vacuum chamber has to be transferred from its closed position into the open position, the differential pressure between the vacuum chamber and the environment has the result that an additional force to open the movable contact can be comparatively small at atmospheric pressure or in some systems with only a small insulating gas pressure. However, if an insulating gas with a smaller dielectric strength is used in the gas-insulated compartment, the pressure in the gas-insulated compartment has to be increased. In practice, this leads to pressures in the gas chamber of, for example, 3 bar so that a differential pressure of approximately 4 bar results when the movable contact is opened, which requires a correspondingly higher opening force.

To nevertheless ensure a fast and proper opening of the movable contact here, the drive mechanism or the spring accumulator could be dimensioned accordingly larger. In accordance with the invention, a counter-pressure element is, however, not provided in the region of the drive mechanism, but rather at the movable contact. This counter-pressure element relieves the movable contact in any position from the environmental pressure acting on it, for example an inner pressure P in a compartment.

The counter-pressure element can be dimensioned comparatively small with regard to its geometrical dimensions so that the installation size of the circuit-breaker does not increase.

In accordance with the invention, the counter-pressure element is subjected to the environmental pressure of the vacuum chamber that also acts on the movable contact of the vacuum chamber, but in the opposite direction of action. A balanced system is hereby provided by which the forces acting on the movable contact and on the counter-pressure element are substantially compensated since they are oriented in opposite directions of action.

The mode of operation described above is independent of the magnitude of the environmental pressure, for example the inner pressure P in the interior of a compartment, so that the circuit breaker described can be used for the most varied environmental pressures without an adaptation being necessary. A change in the environmental pressure, for example due to temperature fluctuations, also does not playa role.

Since the counter-pressure element is part of a pressure-tight sealed compensating reservoir in which an inner pressure p is present, the inner pressure p of the compensating reservoir can be selected so that it is lower than the environmental pressure, for example than the atmospheric pressure or the inner pressure P within a compartment.

Advantageous embodiments of the invention are described in the description, in the drawing, and in the dependent claims.

In accordance with a first advantageous embodiment, the counter-pressure element can be a movable part region of the compensating reservoir, for example, a movable plate, a diaphragm, or a ring surface.

In accordance with a further advantageous embodiment, the counter-pressure element can be part of an expandable bellows or a vacuum bellows or the compensating reservoir can have an expandable bellows or a vacuum bellows. The characteristics of the compensating reservoir can hereby be matched very well to the characteristics of the vacuum chamber.

The bellows or vacuum bellows can be designed in various ways, for example as an edge-welded metal bellows. A long service life with many switching cycles can hereby be achieved in a compact design. Alternatively, the compensating reservoir could also be formed by other kinds of metal bellows or also by a vacuum bellows composed of polymer material. Gas pressure springs and the like can generally also be used as compensating reservoirs.

In accordance with a further advantageous embodiment, surfaces of the counter-pressure element and of the movable contact that are acted on by the environmental pressure are oriented in parallel with or orthogonally to one another. In the case of a parallel arrangement, a comparatively simple design results. For an orthogonal arrangement, deflection elements, such as a toggle lever, a rotary lever or the like, can be provided in the connection between the movable contact and the counter-pressure element in order to allow the force acting on the movable contact and on the counter-pressure element to act in an anti-parallel manner.

In accordance with a further advantageous embodiment, the connection between the counter-pressure element and the movable contact can be arranged in parallel with or also coaxially to the longitudinal axis of the vacuum chamber. The counter-pressure element hereby acts directly on the movable contact and a compact and space-saving arrangement as well as a good force compensation are achieved.

In accordance with a further advantageous embodiment, a plurality of vacuum chambers can be provided whose movable contacts are connected to only one single counter-pressure element. However, it is also possible to associate each movable contact of each vacuum chamber with a respective counter-pressure element. It is also possible to connect the movable contact of a vacuum chamber to a plurality of counter-pressure elements.

The environmental pressure of the vacuum chamber can be suitably selected in accordance with the requirements for the electric strength. The environmental pressure can, for example, be atmospheric pressure or it can also be selected lower than atmospheric pressure if a compartment is used.

In accordance with a further advantageous embodiment, the vacuum chamber comprising the associated counter-pressure element can be arranged in a gas-insulated compartment whose inner pressure is in particular greater than the atmospheric pressure surrounding the compartment. In this case, it can be advantageous if the inner pressure in the compensating reservoir is smaller than the inner pressure in the compartment, in particular smaller by at least a factor of 100.

In accordance with a further advantageous embodiment, a surface of the counter-pressure element acted on by the inner pressure P within the compartment can extend in parallel with a surface of the movable contact acted on by the inner pressure P in the compartment. It is hereby ensured that the surfaces acted on by the inner pressure P in the compartment exert forces in opposite directions on the movable contact, wherein the ratio of the forces can be set by the size of these surfaces and by the inner pressure p in the compensating reservoir.

In accordance with a further advantageous embodiment, the inner pressure p in the compensating reservoir can be selected smaller than the inner pressure P in the compartment, wherein the inner pressure p in the compensating reservoir can at least partly compensate a closing pressure acting on the movable contact. A good opening behavior has been found in arrangements in which the inner pressure p in the compensating reservoir substantially corresponds to the pressure in the vacuum chamber.

Since the inner pressure P in the compartment applies a force to the movable contact and to the counter-pressure element in opposite directions, a balanced system is provided in which the opening movement of the movable contact is independent of the level of the inner pressure P in the compartment.

In accordance with a further advantageous embodiment, the compensating reservoir can be connected to a component fixed to the housing. Such a component fixed to the housing can, for example, be an assembly bracket that forms a bearing for the compensating reservoir.

In accordance with a further advantageous embodiment, the level of the inner pressure p in the compensating reservoir can substantially correspond to the strength of the vacuum in the vacuum chamber. For example, a deviation can be below 10% and in particular below 5%. An optimal force compensation is hereby achieved. The inner pressure p in the compensating reservoir can also be smaller by at least a factor of 100 than the inner pressure P in a compartment.

Figure 1:
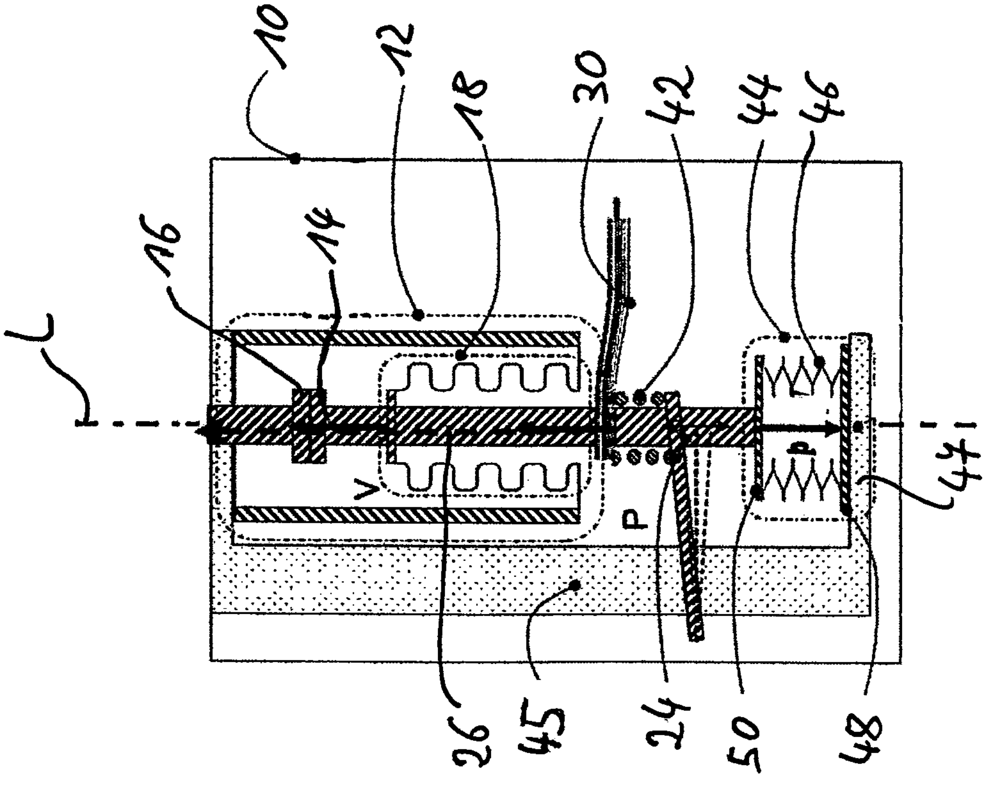
Figure 3:
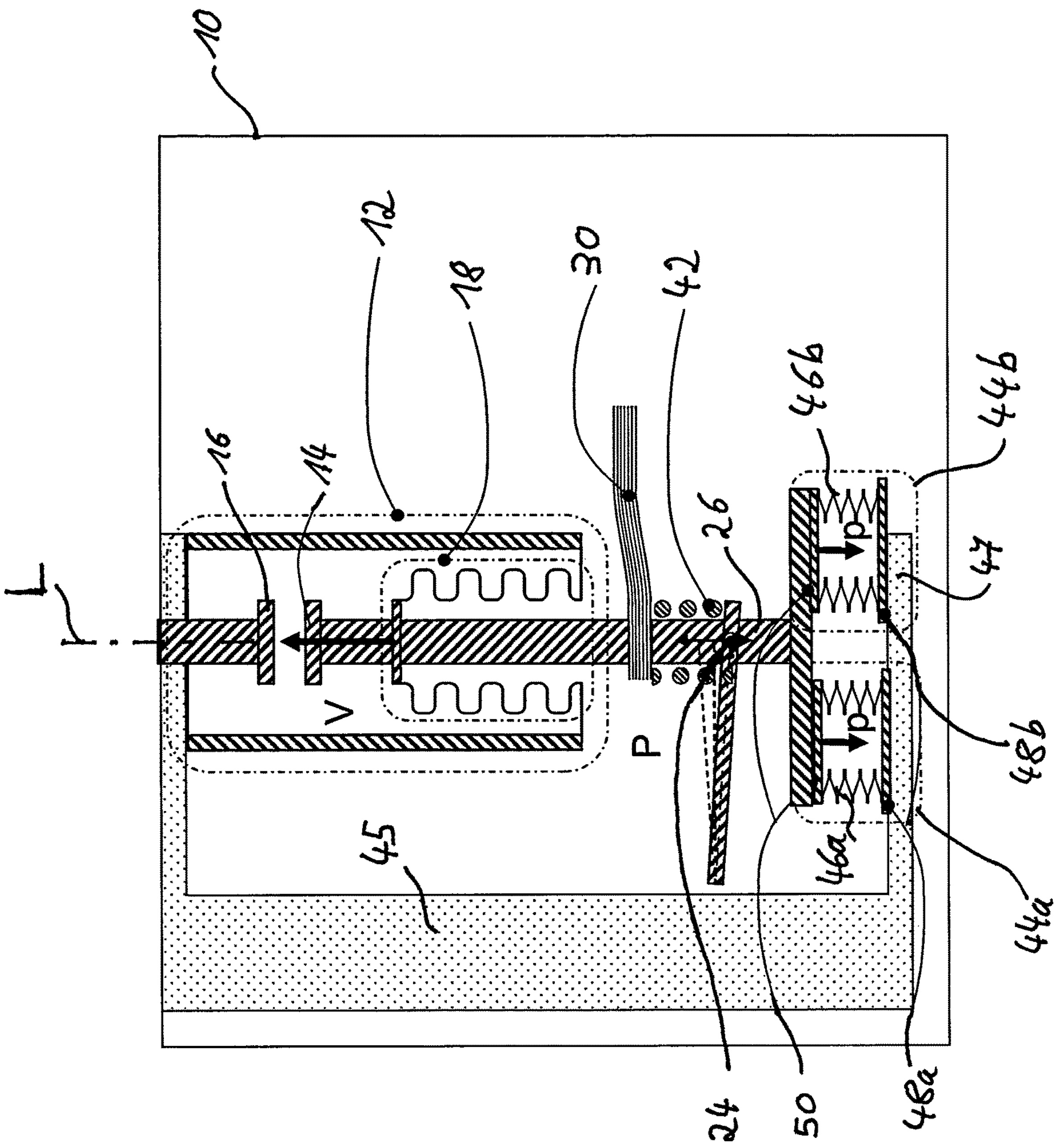
Figure 4:
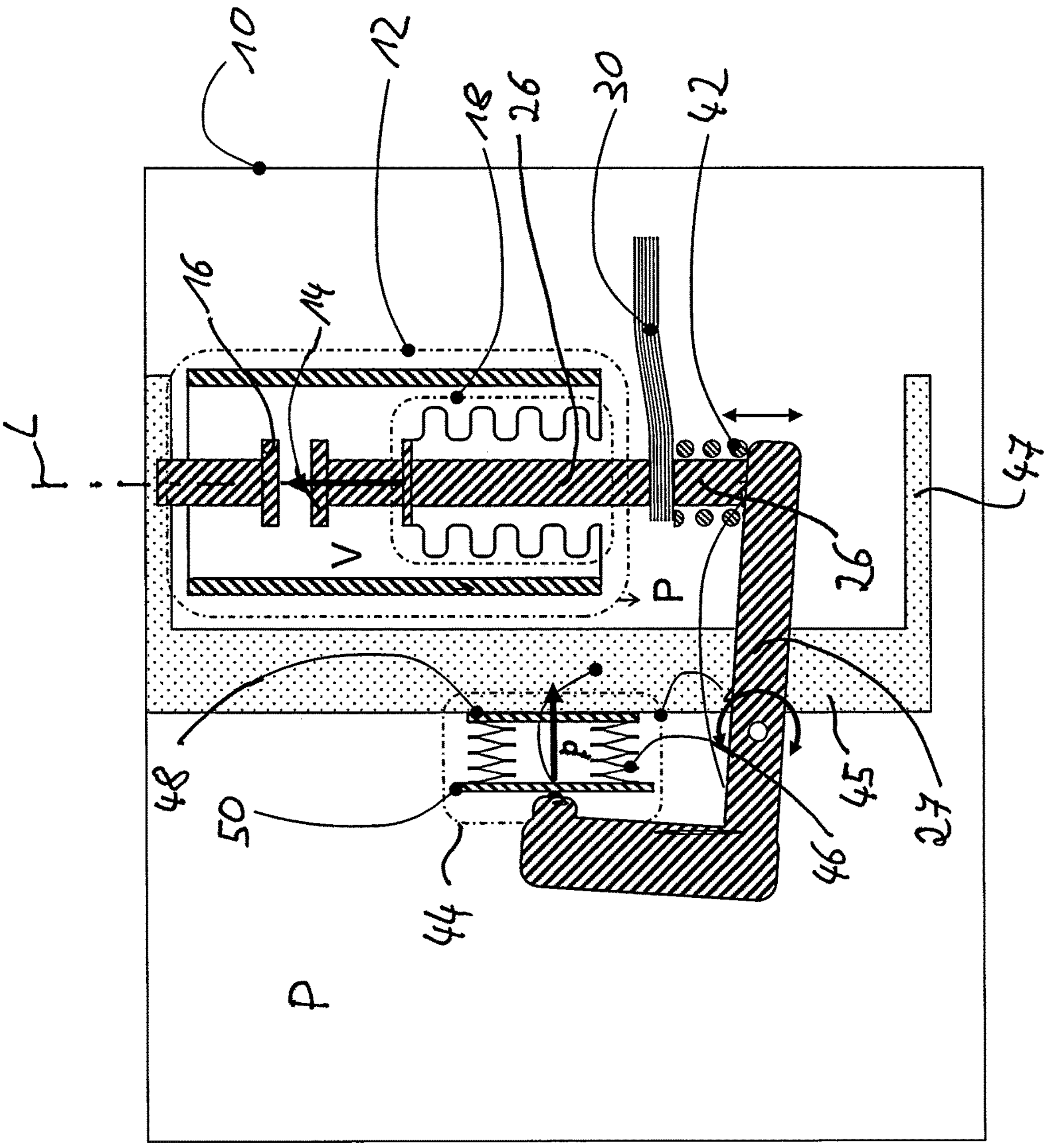
Figure 5:
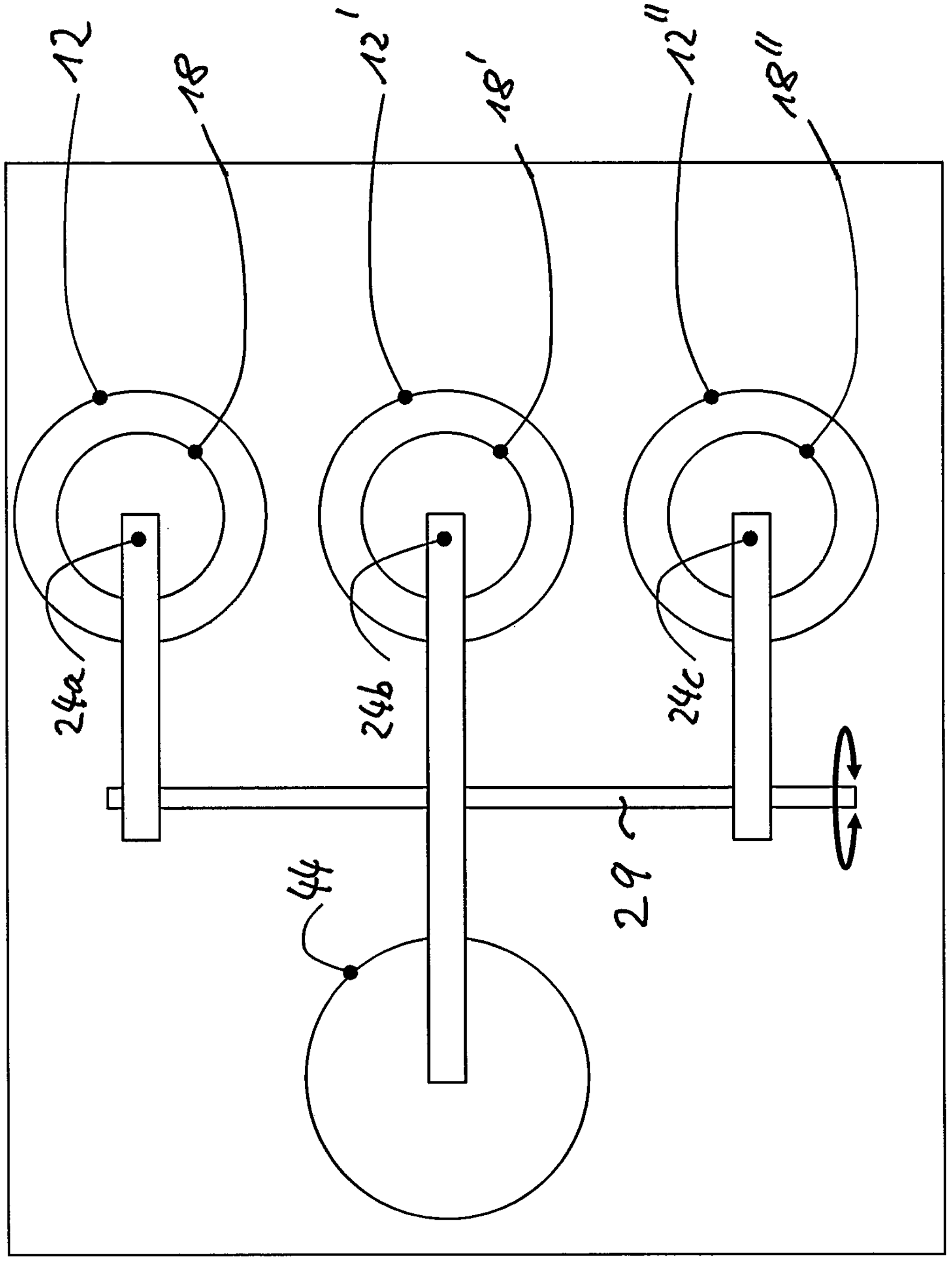

The present invention will be described in the following purely by way of example with reference to an advantageous embodiment and to the enclosed drawings. There are shown:

FIG. 1 a schematic representation of a part of a circuit breaker of a first embodiment with closed contacts;

FIG. 2 a schematic representation of a part of the circuit breaker from FIG. 1 with open contacts;

FIG. 3 a part of a circuit breaker of a further embodiment with open contacts;

FIG. 4 a part of a circuit breaker of a further embodiment with open contacts; and FIG. 5 a schematic representation of a plan view of a circuit breaker of a further embodiment.

FIG. 1 shows, as a possible embodiment of the invention, a section of a circuit breaker, for example of medium-voltage technology, that has (for each phase) a gas-insulated compartment 10 in which a vacuum chamber 12 is arranged that is only partly shown in the Figures. The vacuum chamber 12 has an inner pressure V and a longitudinal axis L along which a movable contact 14 can be adjusted against a fixed contact 16 arranged in the vacuum chamber 12. A drive mechanism, not shown in more detail, comprising a lever 24 serves to move the movable contact 14 between the open position shown in FIG. 2 and the closed position shown in FIG. 1. The drive mechanism transmits the opening or closing movement to the lever 24. The movable contact 14 can hereby be adjusted along the axis L against the fixed contact 16.

As FIGS. 1 and 2 illustrate, the movable contact 14 is fastened to a shaft 26 that extends coaxially to the longitudinal axis L and that is electrically conductively fixedly connected to a flexible line 30 below the vacuum chamber 12 to establish a current-carrying connection.

As shown in FIGS. 1 and 2, a pressure spring 42 is located between the lever 24 and the line 30 on the shaft 26 and ensures that the movable contact 14 is always pressed against the fixed contact 16 with a predetermined contact pressure in the closed position (FIG. 1).

Furthermore, in this embodiment, a compensating reservoir 44 arranged below the vacuum chamber 12 is provided coaxially to the longitudinal axis L, the pressure spring 42 and the vacuum chamber 12 and is fastened at its lower side to a component fixed to the housing in the form of a horizontal retaining bracket 47 that extends at a right angle to a vertical strut 45 in the compartment 10.

The compensating reservoir 44 can be configured as a vacuum bellows as in the embodiment shown and has an inner pressure p in its interior that, for example, corresponds to the vacuum V in the vacuum chamber 12. Here, in the embodiment shown, a movable part region of the compensating reservoir 44, namely its upper diaphragm plate 50, is configured as a counter-pressure element that is acted on by the inner pressure P within the compartment 10. As the Figures illustrate, the counter-pressure element 50 has a (ring) surface that is acted on by the inner pressure P within the compartment 10 and that extends in parallel with a ring surface of the movable contact 14 that is acted on by the inner pressure P in the compartment 10. The connection between the counter-pressure element 50 of the compensating reservoir 44 and the movable contact 14 is provided by the shaft 26 that extends coaxially to the longitudinal axis L.

As a comparison of FIG. 1 and FIG. 2 shows, a bellows 46 of the compensating reservoir 44 is pulled apart somewhat when the contacts are closed and contracts when the movable contact 14 is opened. In this respect, a lower part 48 of the compensating reservoir 44 is connected to the fixed-position retaining bracket 47. The counter-pressure element 50 arranged at the upper side of the compensating reservoir 44 is connected to the shaft 26.

Similarly, a bellows 18 of the vacuum chamber 12 is connected at its lower end to the vacuum chamber 12, whereas the upper end of the bellows 18 is connected in a sealed manner to the shaft 26. The inner pressure P hereby acts on the ring surface between the shaft 26 and the bellows 18.

The mode of operation of the circuit breaker described above is as follows:

In the switched-off state, i.e. when the contacts are separated, the various components of the circuit breaker are in the position shown in FIG. 2. On a transition from the open position into the closed position that is shown in FIG. 1, the lever 24 is moved from the position shown in FIG. 2 into the position shown in FIG. 1. In the course of this movement, the compensating reservoir 44 is simultaneously expanded slightly. After the movable contact 14 contacts the fixed contact 16, the lever 24 is moved even further in the direction of the fixed contact 16 so that the pressure spring 42 is compressed and the position of the components shown in FIG. 1 results.

If an opening is subsequently to take place, the lever 24 is pivoted in the opposite direction so that the movable contact 14 lifts off from the fixed contact 16. Here, the counter-pressure element 50 compensates the force that acts on the movable contact 14 due to the inner pressure P in the compartment 10 since the inner pressure P in the compartment 10 applies a force to the counter-pressure element in the opposite direction. This is in particular advantageous when the environmental pressure of the vacuum chamber, for example the pressure within the gas-insulated compartment, is increased compared to the atmospheric pressure.

It is understood that the circuit breaker described above with its components can have a compartment with corresponding components for each phase.

Further embodiments of a circuit breaker are described below with reference to FIG. 3 to FIG. 5, with identical reference numerals being used for identical components.

FIG. 3 shows a further embodiment of a circuit breaker that differs from the embodiment shown in FIGS. 1 and 2 in that a compensating reservoir 44 is not provided at the lower end of the shaft 26, but rather two compensating reservoirs 44*a* and 44*b* are provided that are arranged in parallel next to one another. Both compensating reservoirs are fastened to the retaining bracket 47 with their respective lower parts 48*a* and 48*b*. At their upper sides, the two compensating reservoirs 44*a* and 44*b* are connected via a common counter-pressure element 50 to whose upper side the shaft 26 is fastened. Both compensating reservoirs 44*a* and 44*b* each have an expandable bellows 46*a* and 46*b*.

In the embodiment shown in FIG. 4, the pressure-tight sealed compensating reservoir 44 is not arranged below the vacuum chamber 12 but next to the vacuum chamber 12, and indeed such that the counter-pressure element 50 of the compensating reservoir 44, with its surface acted on by the environmental pressure P of the vacuum chamber 12, is oriented orthogonally to the surface of the movable contact 14 acted on by the environmental pressure P. In this respect, the lower part 48 of the compensating reservoir 44 is fastened to the vertical strut 45 so that, in the embodiment shown, the counter-pressure element 50 extends vertically and at a right angle to the horizontal with its surface acted on by the environmental pressure P. To achieve the desired compensation of the forces in this respect, the lower end of the shaft 26 is connected to the counter-pressure element 50 via an L-shaped rotary lever 27 with a horizontal axis of rotation, wherein the rotary lever 27 is connected to the drive mechanism. The compensating reservoir 44 hereby compresses when the shaft 26 is moved downward since this movement is transmitted to the counter-pressure element 50 by a clockwise movement of the rotary lever 27.

FIG. 5 shows a schematic plan view of a further embodiment of a circuit breaker. In this embodiment, three vacuum chambers 12, 12' and 12" are arranged next to one another and are provided with one bellows 18, 18' and 18" each. The movable contacts, not shown in FIG. 5, of the three vacuum chambers are connected via a respective one lever 24*a*, 24*b* and 24*c* to a shaft 29 that is connected to the drive mechanism. In this embodiment, the lever 24*b* is formed as an elongated rotary lever, wherein one end of the rotary lever 24*b* is connected to the movable contact of the vacuum chamber 12' and the opposite end of the rotary lever 24*b* is connected to the counter-pressure element of the compensating reservoir 44. In this embodiment, the movable contacts and the levers 24*a*, 24*b*, and 24*c* move together and a single compensating reservoir 44 serves to compensate the environmental pressure acting on the movable contacts of the vacuum chambers 12, 12', and 12".

The invention claimed is:

1. A circuit breaker comprising:

at least one vacuum chamber that has a longitudinal axis, a fixed and a movable contact, said movable contact being acted on by an environmental pressure of the vacuum chamber, and a drive mechanism for moving the movable contact between an open position and a closed position, wherein the movable contact is connected to at least one counter-pressure element outside the vacuum chamber, said counter-pressure element being a movable component of a compensating reservoir that is pressure-tight sealed and that has an inner pressure, wherein the vacuum chamber and the counter-pressure element are arranged in a gas-insulated compartment, and wherein the inner pressure in the compensating reservoir is smaller than an inner pressure in the gas-insulated compartment.

2. The circuit breaker in accordance with claim 1, wherein the counter-pressure element is a movable part region of the compensating reservoir.

3. The circuit breaker in accordance with claim 1, wherein the compensating reservoir has an expandable bellows.

4. The circuit breaker in accordance with claim 1, wherein surfaces of the counter-pressure element and of the movable contact that are acted on by the environmental pressure are oriented in parallel with or orthogonally to one another.

5. The circuit breaker in accordance with claim 1, wherein a connection between the counter-pressure element and the movable contact is arranged in parallel with or coaxially to the longitudinal axis.

6. The circuit breaker in accordance with claim 1, wherein a connection between the counter-pressure element and the movable contact has a rotary lever.

7. The circuit breaker in accordance with claim 1, wherein a plurality of vacuum chambers are provided whose movable contacts are connected to a single counter-pressure element.

8. The circuit breaker in accordance with claim 1, wherein the movable contact is connected to a plurality of counter-pressure elements.

9. The circuit breaker in accordance with claim 1, wherein a plurality of vacuum chambers are provided whose movable contacts are connected to a plurality of counter-pressure elements.

10. The circuit breaker in accordance with claim 1, wherein the environmental pressure of the vacuum chamber and of the counter-pressure element is atmospheric pressure.

11. The circuit breaker in accordance with claim 1, wherein the gas inner pressure of the gas-insulated compartment is greater than an atmospheric pressure surrounding the gas-insulated compartment.

12. The circuit breaker in accordance with claim 1, wherein the inner pressure in the compensating reservoir is smaller by at least a factor of 100 than the inner pressure in the gas-insulated compartment.

13. The circuit breaker in accordance with claim 1, wherein the inner pressure in the compensating reservoir at least partly compensates a closing pressure acting on the movable contact.

14. The circuit breaker in accordance with claim 1, wherein the inner pressure in the compensating reservoir substantially corresponds to a pressure in the vacuum chamber.

15. A circuit breaker comprising:

at least one vacuum chamber that has a longitudinal axis, a fixed and a movable contact, said movable contact being acted on by an environmental pressure of the vacuum chamber, and a drive mechanism for moving the movable contact between an open position and a closed position, wherein the movable contact is connected to at least one counter-pressure element outside the vacuum chamber, said counter-pressure element being a movable component of a compensating reservoir that is pressure-tight sealed and that has an inner pressure, and wherein a connection between the counter-pressure element and the movable contact has a rotary lever.

16. A circuit breaker comprising:

at least one vacuum chamber that has a longitudinal axis, a fixed and a movable contact, said movable contact being acted on by an environmental pressure of the vacuum chamber, and a drive mechanism for moving the movable contact between an open position and a closed position, wherein the movable contact is connected to at least one counter-pressure element outside the vacuum chamber, said counter-pressure element being a movable component of a compensating reservoir that is pressure-tight sealed and that has an inner pressure, and wherein a plurality of vacuum chambers are provided whose movable contacts are connected to a single counter-pressure element.

17. A circuit breaker comprising:

at least one vacuum chamber that has a longitudinal axis, a fixed and a movable contact, said movable contact being acted on by an environmental pressure of the vacuum chamber, and a drive mechanism for moving the movable contact between an open position and a closed position, wherein the movable contact is connected to at least one counter-pressure element outside the vacuum chamber, said counter-pressure element being a movable component of a compensating reservoir that is pressure-tight sealed and that has an inner pressure, wherein the vacuum chamber and the counter-pressure element are arranged in a gas-insulated compartment, and wherein the inner pressure in the compensating reservoir at least partly compensates a closing pressure acting on the movable contact.

18. A circuit breaker comprising:

at least one vacuum chamber that has a longitudinal axis, a fixed and a movable contact, said movable contact being acted on by an environmental pressure of the vacuum chamber, and a drive mechanism for moving the movable contact between an open position and a closed position, wherein the movable contact is connected to at least one counter-pressure element outside the vacuum chamber, said counter-pressure element being a movable component of a compensating reservoir that is pressure-tight sealed and that has an inner pressure, and wherein the inner pressure in the compensating reservoir substantially corresponds to a pressure in the vacuum chamber.

* * * * *